(No Model.)

G. F. SEAVER.
FIRE EXTINGUISHER FOR CAR HEATERS.

No. 380,057. Patented Mar. 27, 1888.

WITNESSES:
Chas. Niela
C. Sedgwick

INVENTOR:
G. F. Seaver
BY Munn & Co.
ATTORNEYS.

UNITED STATES PATENT OFFICE.

GEORGE FREEMAN SEAVER, OF DOVER, NEW HAMPSHIRE.

FIRE-EXTINGUISHER FOR CAR-HEATERS.

SPECIFICATION forming part of Letters Patent No. 380,057, dated March 27, 1888.

Application filed March 5, 1887. Serial No. 229,787. (No model.)

*To all whom it may concern:*

Be it known that I, GEORGE FREEMAN SEAVER, of Dover, in the county of Strafford and State of New Hampshire, have invented a new and Improved Fire-Extinguisher for Car-Heaters, of which the following is a full, clear, and exact description.

The object of my invention to provide for car-heaters a new and improved fire-extinguisher which will extinguish the fire when the heater is thrown on its side by upsetting of the car or from other causes.

The invention consists in certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1:
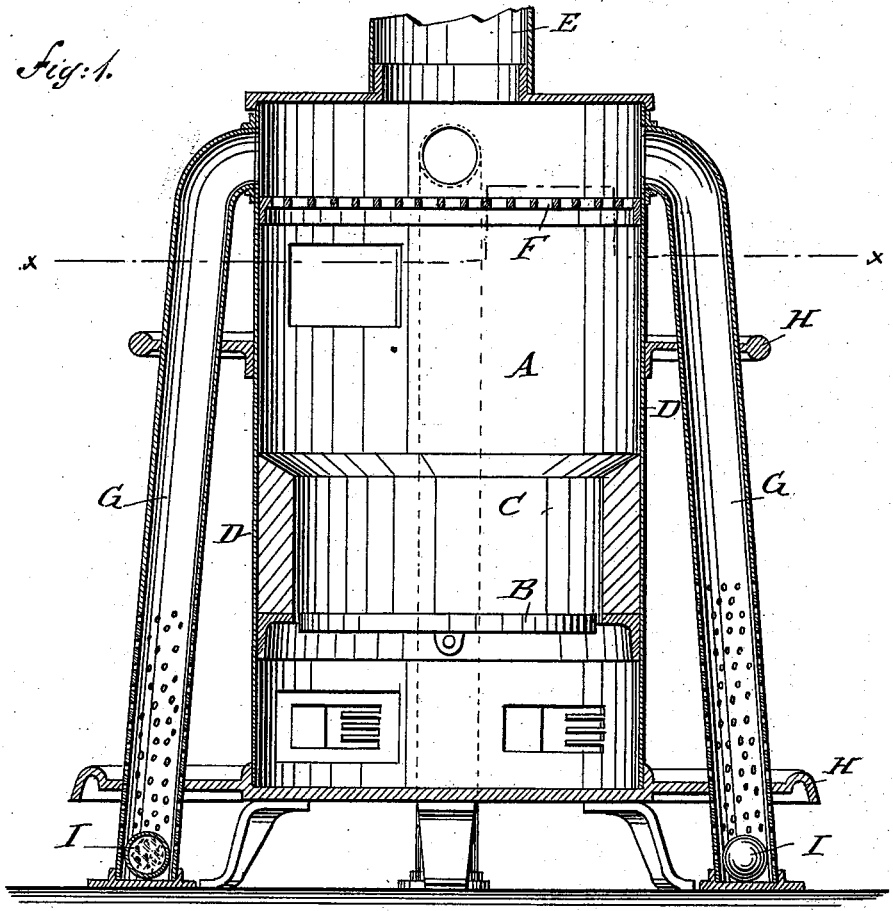
Figure 2:
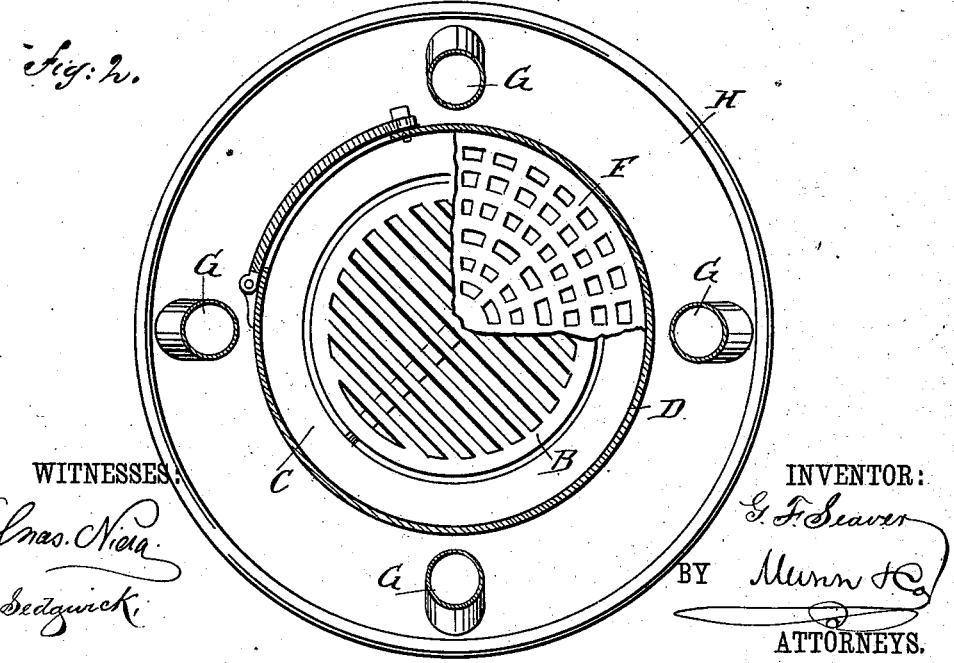

Figure 1 is a central sectional elevation of a car-heater provided with my improvement, and Fig. 2 is a sectional plan view of the same on the line $x\ x$ of Fig. 1.

The car-heater A, of any approved construction, is provided with the usual grate-bars, B, the fire-place C, and the shell D, from the top of which leads the smoke-pipe E. In the upper part of the shell D is secured the perforated plate F, upon the top of which open the upper ends of the inclined pipes or flues G, extending outside of the heater to the bottom or foundation on which the heater is located. The several pipes G are held in place by the rims H, secured to the shell D, and through which pass the said pipes G. The lower part of each pipe G is preferably perforated, as shown, so as to admit air to prevent the pipe from being heated. In the bottom of each pipe G is held a ball, I, of glass or other suitable material, which is filled with a fire-extinguishing compound. The heater A is also provided with the usual inlet-doors and dampers, ash-pit, &c.

It will be seen that when the heater is thrown on its side by an accident to the car in which it is located, or by other causes, then the balls I will roll through their respective pipes G and fall upon the perforated plate F, which they will strike with such force that they will be broken and their fire-extinguishing compound will be scattered over the fire in the fire-place C, so that the fire will be extinguished. The perforated plate F may be omitted, so that the balls I will be broken by striking the inside of the shell or the fuel itself.

Having thus fully described my invention, I claim as new and desire to secure by Letters Patent—

1. The combination, with a car-heater, of inclined pipes secured to the said heater and leading into the upper end of the heater, a perforated plate held in the upper end of the said heater and upon the top of which open the said inclined pipes, and balls containing a fire-extinguishing compound and held in the said inclined pipes, substantially as shown and described.

2. The combination, with a car-heater, of inclined pipes leading into the upper end of the said heater and being perforated in their lower parts, a perforated grate held in the upper part of the said heater and upon which open the said inclined pipes, rims secured to the shell of the said heater to hold the said pipes in place, and balls containing a fire-extinguishing compound and held in the said inclined pipes, substantially as shown and described.

GEORGE FREEMAN SEAVER.

Witnesses:
ROSCOE G. KILHAM,
GEORGE F. SEAVER, Jr.